US009431815B1

(12) United States Patent
Findley

(10) Patent No.: US 9,431,815 B1
(45) Date of Patent: Aug. 30, 2016

(54) CABLE FITTING WITH GRIP ASSEMBLY

(71) Applicant: Robert Findley, Fort Worth, TX (US)

(72) Inventor: Robert Findley, Fort Worth, TX (US)

(*) Notice: Subject to any disclaimer, the term of this patent is extended or adjusted under 35 U.S.C. 154(b) by 0 days.

(21) Appl. No.: 14/728,298

(22) Filed: Jun. 2, 2015

(51) Int. Cl.
H02G 15/00 (2006.01)
H02G 15/013 (2006.01)

(52) U.S. Cl.
CPC .................................. *H02G 15/013* (2013.01)

(58) Field of Classification Search
CPC .. H02G 15/00; H02G 15/007; H02G 15/013; H02G 15/04; H02G 15/103; H02G 3/18; H02G 3/0675; H02G 3/065; H01R 4/66; H01R 13/59
USPC ....... 174/650, 651, 652, 653, 654, 660, 135, 174/152 G, 153 G; 16/2.1, 2.2; 248/68.1, 49
See application file for complete search history.

(56) References Cited

U.S. PATENT DOCUMENTS

| 2,369,413 | A | | 2/1945 | Rusz | |
|---|---|---|---|---|---|
| 3,567,843 | A | | 3/1971 | Collins et al. | |
| 4,250,348 | A | * | 2/1981 | Kitagawa | H02G 3/065 174/652 |
| 4,350,840 | A | | 9/1982 | Michaels | |
| 4,525,000 | A | | 6/1985 | Bachle | |
| 4,549,038 | A | | 10/1985 | Masheris et al. | |
| 4,739,126 | A | * | 4/1988 | Gutter | H02G 3/065 174/655 |
| 5,410,104 | A | * | 4/1995 | Gretz | H02G 3/0675 174/653 |
| 5,543,582 | A | * | 8/1996 | Stark | H02G 3/0675 174/653 |
| 6,177,633 | B1 | * | 1/2001 | Gretz | H02G 15/007 174/153 G |
| 7,156,671 | B2 | * | 1/2007 | Kauth | H01R 4/66 439/583 |
| 7,300,309 | B2 | | 11/2007 | Montena | |
| 7,749,021 | B2 | | 7/2010 | Brodeur | |
| 7,900,970 | B2 | * | 3/2011 | Chiu | H02G 3/0675 174/655 |
| 8,563,876 | B1 | * | 10/2013 | Gretz | H02G 3/083 174/653 |
| 8,766,109 | B2 | * | 7/2014 | Duval | H01R 13/59 174/650 |
| 8,895,877 | B2 | * | 11/2014 | Brodeur | H02G 15/007 174/650 |
| 9,231,388 | B2 | * | 1/2016 | Chavan | H02G 3/0608 |

* cited by examiner

Primary Examiner — Angel R Estrada

(57) ABSTRACT

An adjustable cable fitting with a removable grip assembly secures and retains a cable passing therethrough. The grip assembly has a flexible tightening member and a resilient grommet inserted in the tightening member. The grip assembly is further disposed between a connector and a compression cap, such that the tightening member assists the grommet in creating and maintaining a watertight seal with the cable when tightening the compression cap to the connector. The tightening member also assists the grommet in securing and retaining the cable by preventing it from being pulled out of the fitting. The tightening member has a plurality of spaced apart retaining arms. Each arm has a retaining flange at one end that overhangs past an end of the grommet and which has gripper elements formed thereon for directly gripping the cable.

16 Claims, 3 Drawing Sheets

CABLE FITTING WITH GRIP ASSEMBLY

FIELD OF THE INVENTION

The present invention relates to a cable fitting with a grip assembly for securing and retaining a cable, and forming a watertight seal.

BACKGROUND

Cable fittings are typically used to secure and seal electrical cables and cords. Conventional cable fittings often include a one-piece grommet disposed inside a connector for gripping the cable. The cable is inserted through the grommet and secured via compression of the grommet by a nut. Since cables come in various shapes and sizes, the range of cables which can be secured by any given fitting is determined in part by the inner diameter of the grommet.

A clamping ring, such as an O-ring, is commonly used to secure the cable and provide a protective seal. For example, conventional fittings may include a clamping ring that works with a grommet by shifting toward and into an annular gap around the cord itself to create a sealing effect in response to an axial loading. However, such cable fittings often have major disadvantages since the resulting sealing effect is minimal. This allows for the possibility of dirt, debris, dust and especially water to enter into the connector.

Other conventional cable fittings use a wedged bushing and chuck system for restraining and securing a cable. Typical chuck systems engage the cable tangentially and compress the cable in order to prevent it from slipping or dislodging from the connector. However, using a chuck to tighten a connector can easily increase the amount of strain on the cable potentially resulting in damage thereto.

It is apparent from the foregoing that conventional cable fittings have serious drawbacks and disadvantages, and thus there exists a clear need for a cable fitting that solves these aforementioned problems. It is therefore an object of the present invention to provide a cable fitting that secures and retains a cable, and which is configured to form a water tight seal. It is a further object of the present invention to provide an improved cable fitting having a grip assembly configured to protect the cable against axial movement by helping to retain and secure the cable from being pulled out of the fitting, such that pulling the cable against the fitting results in a tighter grip with the fitting. It is a still further object of the present invention to provide an improved cable fitting having a grip assembly configured to form and maintain a water tight seal. It is a still further object of the present invention to provide a quick and easy way to secure and retain a wide range of cables having various size diameters while preventing damage to the cable.

SUMMARY

The present invention provides an adjustable cable fitting that comprises a connector, a compression cap and a removable grip assembly for securing and retaining a cable or cord, as well as for forming and maintaining a water tight seal therewith. The grip assembly includes a grommet or gland, and a flexible tightening member that surrounds the outer surface of the grommet. The tightening member is inserted between the connector and the cap, and is further removably coupled to the outer surface of the grommet.

The tightening member is configured to assist the grommet in securing and retaining the cable by preventing it from being pulled out of the fitting. A bottom end of the tightening member extends past a corresponding bottom end of the grommet when coupled thereto, such that the bottom end of the tightening member forms an overhang portion. This overhang portion of the tightening member is adapted to directly clamp or latch onto the outer surface of the cable or cable jacket. The flexible tightening member extends past the bottom end of the grommet to clamp the cable and also to assist with the tightening of the grommet to the cable. Thus, the tightening member accordingly forms a grip with the cable that assists the grommet and provides strain relief, thereby preventing the cable from slipping or pulling out of the fitting while maintaining the cable's structural integrity and preventing damage thereto.

The tightening member also assists the grommet in forming and maintaining the water tight seal when the compression cap is screwed with the connector. The use of such a tightening member coupled with a grommet in a hand-tightened fitting advantageously forms a watertight grip with the cable to form a seal that prevents water, dirt and other undesirable debris from entering and passing through the fitting. The insertable tightening member also advantageously provides added pull out protection of the cable without the need for a clamping ring. The improved cable fitting of the present invention further accommodates a range of cable diameter sizes, as well as those having non-uniform surfaces.

BRIEF DESCRIPTION OF THE DRAWINGS

The numerous other advantages, features and functions of embodiments of a cable fitting with a grip assembly will become readily apparent and better understood in view of the following description and accompanying drawings. The following description is not intended to limit the scope of the present invention, but instead merely provides exemplary embodiments for ease of understanding.

Figure 2:
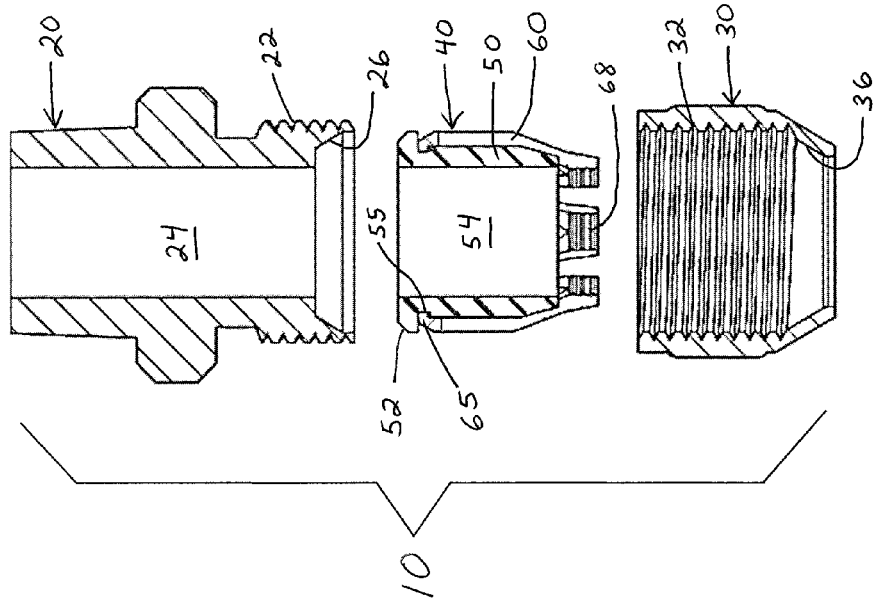
FIG. 2 is a cross-sectional schematic view of the cable fitting with an adjustable grip assembly of FIG. 1 taken along line II-II.
Figure 1:
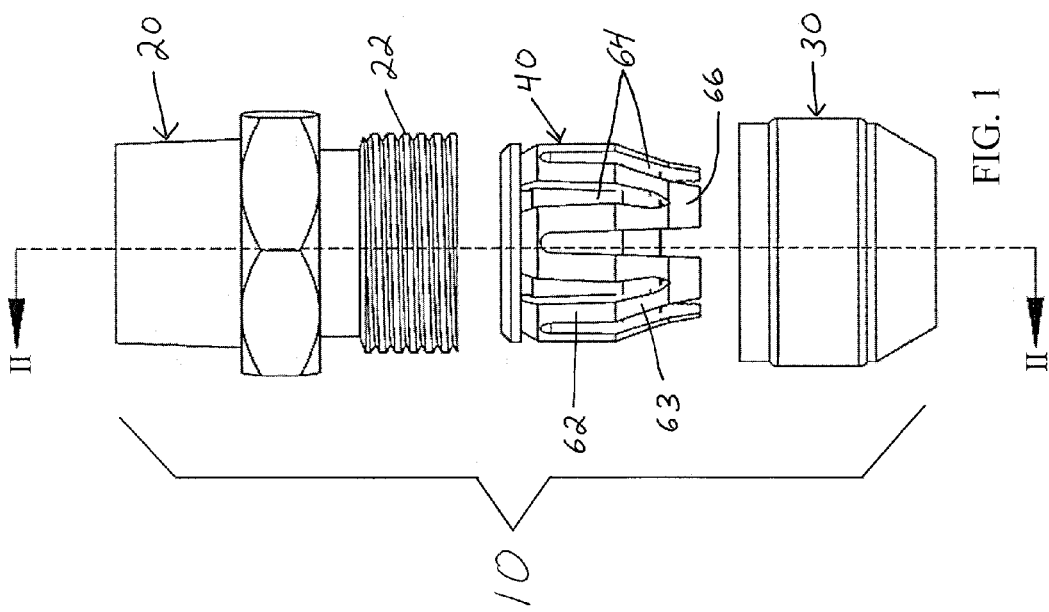
FIG. 1 is an exploded view of a cable fitting with an adjustable grip assembly according to an aspect of the present invention.
Figure 4:
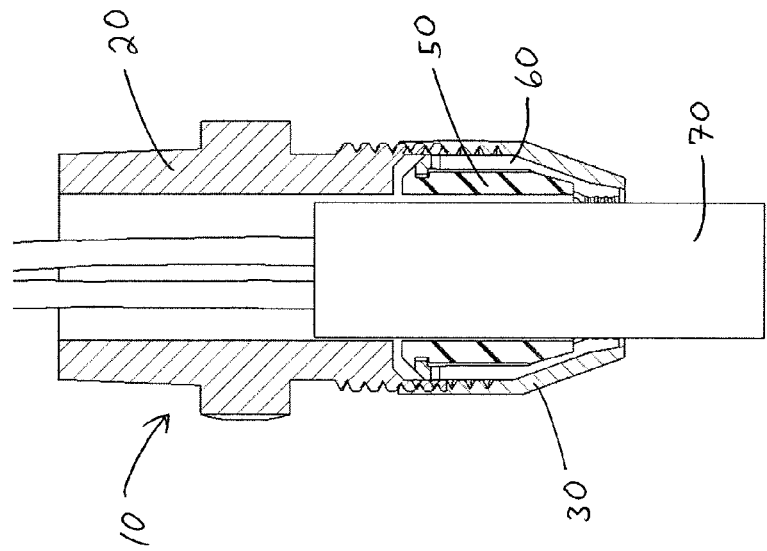
FIG. 4 is a cross-sectional schematic view of the cable fitting of FIG. 3 taken along line IV-IV.
Figure 3:
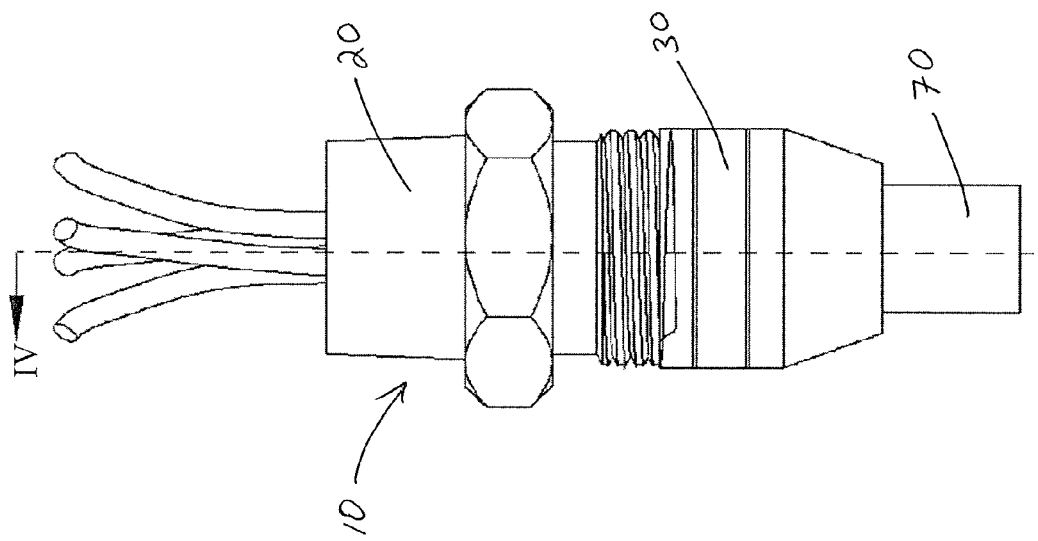
FIG. 3 is an assembly view of the cable fitting showing a cable jacket with cables passing therethrough.

It should be noted that the drawing figures are not necessarily drawn to scale, but instead are drawn to provide a better understanding of the components thereof, and are not intended to be limiting in scope, but rather to provide exemplary illustrations. It should further be noted that the figures illustrate exemplary configurations of a cable fitting with a grip assembly, and in no way limit the structures or configurations thereof according to the present disclosure.

DETAILED DESCRIPTION

A better understanding of different embodiments of the invention may be had from the following description read in conjunction with the accompanying drawings in which like reference characters refer to like elements.

FIGS. 1-4 depict a fitting 10 according to the present invention for securing and retaining a cable, cord or cable jacket 70, such as for electrical cables, and forming and maintaining a watertight seal therewith. The fitting 10 comprises a connector body 20, a compression cap 30, such as a screw nut, and a grip assembly 40 removably arranged inside and between the connector body 20 and the compression cap 30.

The fitting 10 is configured to allow for passage of the cable jacket 70 through the connector body 20, the compression cap 30 and the grip assembly 40. In particular, the connector body 20 has a generally tubular axial through hole 24 to allow for passage of the cable therethrough. A cylindrical connection end of the connector body 20 has an outer threaded portion 22, and a cylindrical connection end of the compression cap 30 has an inner threaded portion 32, wherein the outer threaded portion 22 is adapted to correspondingly mate with the inner threaded portion 32. The compression cap 30 further has an inner frustoconical portion located at an end opposite the inner threaded portion 32, and which defines an inner inclined surface 36. Similarly, the connector body 20 has an inner frustoconical portion located at the same end as the outer threaded portion 22, and which defines an inner inclined surface 26. The space between the inner inclined surface 26 of the connector body and the inner inclined surface 36 of the cap defines a compression chamber which houses the removable grip assembly 40.

The grip assembly 40 is adjustable and comprises a resilient grommet 50 attached to a flexible tightening member 60. The grommet 50 has a generally tubular shape and includes an axial through hole 54 axially extending therethrough to accommodate the cable jacket 70. The grommet may be made of rubber or other suitable elastomeric material capable of being compressed and returning to its original shape after such compression. A top end of the grommet 50 includes an outwardly extending annular lip 52 defining an outer inclined surface adapted to abut the inner inclined surface 26 of the connector body 20. It should be appreciated that the tightening member 60 may be made of a material that is flexible enough to bend under an applied force and return to its original shape when the force is no longer applied, but rigid enough to grab the cable jacket 70 and compress the grommet 50, as will be described below.

The tightening member 60 may be integrally formed as one piece and has a generally tubular shape corresponding to the shape of the grommet 50 such that the tightening member is configured to receive the grommet. Stated another way, the grommet 50 is inserted into the tightening member 60 so that the tightening member 60 circumferentially surrounds the outside of the grommet 50. The tightening member includes a plurality of retaining arms 62 spaced apart by corresponding slits 64 annularly arranged in an alternating manner. Each retaining arm 62 is thus spaced apart by a slit 64 and is bendable relative to the grommet 50 since the flexible tightening member 60 may be made of plastic, plastic composite or other flexible material.

Each retaining arm 62 includes a compression portion including an outer inclined surface 63 adapted to abut the inner inclined surface 36 of the compression cap 30. Further, each retaining arm 62 is cantilevered from a connection flange 65 provided at a top end of the tightening member and extends toward the bottom end of the tightening member. A plurality of retaining flanges 66 may be provided at a bottom end of the tightening member, wherein each retaining flange connects two adjacent retaining arms 62. Accordingly, each retaining arm 62 may be spaced by an alternately disposed top slit and bottom slit, such that every other slit 64 is a bottom slit that is open at the bottom end of the tightening member. Arranging the slits 64 in such a manner allows for the clamping action of the tightening member to evenly press into the grommet from all around. As will be discussed in greater detail below, it should further be appreciated that each retaining arm may be separately cantilevered from a connection flange at the top of the tightening member, wherein an opposite bottom end of each retaining arm includes a respective retaining flange. Moreover, each retaining arm having a corresponding retaining flange may be uniformly spaced apart by slits open at the bottom end of the tightening member. In other words, each retaining flange may be connected to only one retaining arm and spaced apart by only bottom slits.

The connection flange 65 may extend inwardly for removably and securely engaging a corresponding recess 55 annularly disposed on the outer surface of the grommet 50. An inner surface of each retaining flange 66 includes at least one gripper element 68, and preferably a plurality of gripper elements, such as straight teeth-like projections. The retaining flange 66 and the connection flange 65 are thus configured to engage the cable and the outer recess 55 of the grommet, respectively. Further, each retaining arm 62 may have an inner surface that is arcuate or semi-cylindrical for engaging a corresponding outer surface of the grommet 50.

In use, a cable is positioned in the fitting 10 by passing through the connector body 20, the compression cap 30 and the grip assembly 40. The connector body and cap are screwed together, which axially reduces the volume in the compression chamber that houses the grip assembly 40. Thus, tightening the compression cap 30 to the connector body 20 reduces the volume in the compression chamber, which correspondingly compresses the grip assembly 40 thereby tightening the grip on the cable. The grip assembly 40 can therefore accommodate cables of various sized diameters.

As the cap 30 is further screwed on the connector body 20, the inner inclined surface 26 of the connector body engages the inclined surface of the outer annular lip 52 of the grommet 50 to apply both axial and lateral compressive forces thereto. Similarly, the inner inclined surface of the cap 30 engages the outer inclined surface 63 of the compression portion of the tightening member 60 to apply both axial and lateral compressive forces thereto during tightening of the cap. The resulting compression of the tightening member 60 is further passed to the grommet via the plurality of retaining arms 62 to assist the grommet in retaining the cable. In other words, the plurality of retaining arms 62 are urged inward toward the grommet in order to compress the grommet against the cable to tightly secure and retain the cable. This compression of the tightening member clamping down on the grommet further assists the grommet in forming and maintaining a watertight seal with the cable.

Additionally, each retaining flange 66 is arranged to extend past a bottom end of the grommet so that the gripper elements 68 are configured to grip the cable. The compression on the flexible tightening member 60 resulting from tightening the cap 30 to the connector 20 urges the retaining arms 62 to bend inwardly, which correspondingly results in the retaining flanges 66 deflecting inward. This causes the gripping teeth 68 located on the inner surface of each retaining flange to clamp, or bite, into the outside of the cable. Once the gripper elements 68 clamp to the cable, any subsequent pulling of the cable correspondingly pulls the tightening member 60. Applying such axial tension on the tightening member causes additional inward lateral compression to be applied to the grommet via each retaining arm 62. Accordingly, pulling the cable harder results in a stronger grip on the cable. Thus, the gripper elements 68 help retain the cable and keep it from being pulled out of the fitting 10 when tension is applied to the cable by creating a stronger grip therewith.

Figure 5:
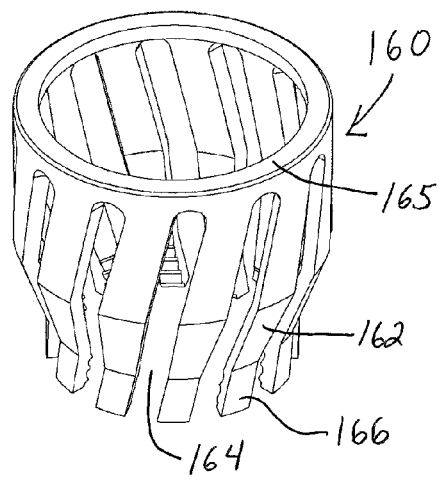
FIG. 5 is a perspective view of a tightening member of the cable fitting according to another aspect of the present invention.
Figure 6:
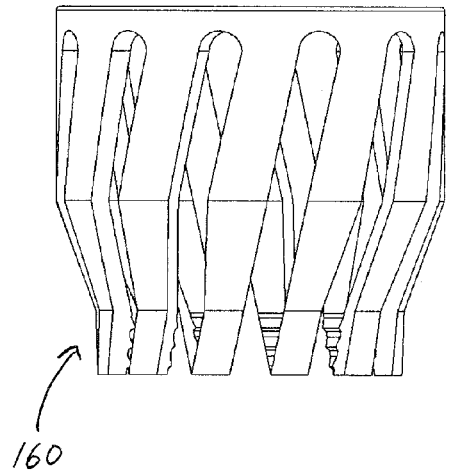
FIG. 6 is a side view of the tightening member of FIG. 5.

Referring to FIGS. 5-6, another variation of a tightening member 160 is shown. A top end of the tightening member 160 defines an inwardly extending connection flange 165 continuously formed along its entire inner annular periphery for engaging a corresponding annular recess on the grommet. The retaining arms 162 are parallel to each other and spaced apart by adjacent slits 164. A top end of each retaining arm 162 is separately cantilevered from the top end of the tightening member and includes a corresponding retaining flange 166 provided at a bottom end. Each retaining arm 162 is bendable, for example at its middle portion, for compressing the grommet after the retaining arm makes contact with the cable jacket. Alternatively, each retaining arm 162 may be bendable for compressing the grommet into the cable jacket such that each corresponding retaining flange 166 then engages with the cable jacket. The tightening member 160 therefore ensures the grommet seal at the inner surface 26 of the connector body 20 since the top of the grommet will not pinch or bunch where the seal is formed, which is advantageous for large fittings. Each retaining arm 162 extends along the length of the tightening member. It should be appreciated that each retaining arm 162 may further extend non-perpendicularly from the top end of the tightening member 160. For example, the retaining arms 162 may be slanted at an offset angle relative to the longitudinal axis of the tightening member 160 in order to help uniformly compress the grommet when the cap is screwed to the connector body during tightening.

Figure 7:
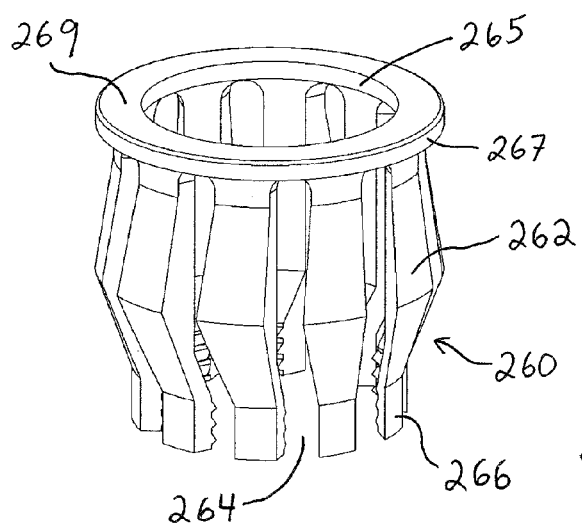
FIG. 7 is a perspective view of a tightening member of the cable fitting according to another aspect of the present invention.
Figure 8:
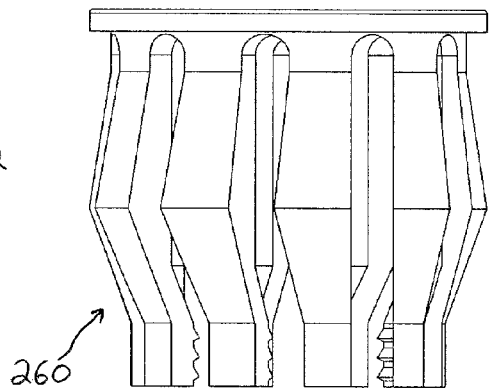
FIG. 8 is a side view of the tightening member of FIG. 7

FIGS. 7-8 illustrate another variation of the tightening member 260 having a top end with an enlarged flat surface 269, wherein the tightening member ensures the grommet seal at the inner surface 26 of the connector body 20. The top end includes a continuous inwardly extending connection flange 265 and a continuous outwardly extending connection flange 267. The enlarged flat surface 269 advantageously protects the annular lip of the grommet from crushing the tightening member during tightening, and also helps secure the grommet in place. Similar to the tightening member shown in FIGS. 5-6, the tightening member 260 includes retaining arms 262 that are parallel to each other and spaced apart by adjacent slits 264. A top end of each retaining arm 262 is separately cantilevered from the top end of the tightening member and includes a corresponding retaining flange 266 provided at a bottom end. Each retaining arm 262 is bendable, for example at its middle portion, for compressing the grommet after the retaining arm makes contact with the cable jacket. Alternatively, each retaining arm 262 may be bendable for compressing the grommet into the cable jacket such that each corresponding retaining flange 266 then engages with the cable jacket.

As previously described, the improved cable fitting of the present invention is able to provide a quick and easy way to secure and retain a wide range of cables having various size diameters while preventing damage to the cable. The improved cable fitting of the present invention advantageously provides a hand tightened grip assembly that secures and retains the cable. The grip assembly protects the cable from being pulled out of the fitting since such pulling of the cable against the fitting results in a tighter grip. The grip assembly of the present invention further advantageously forms and maintains a water tight seal.

Although the present invention has been disclosed in the context of certain exemplary embodiments, the present invention extends beyond the specifically disclosed embodiments to other alternative embodiments, combinations of embodiments, and/or uses of the invention and modifications and equivalents thereof. It should therefore be understood that there is no intention to limit the disclosure to the specific embodiments disclosed, but on the contrary, the intention is to cover all modifications, alternative constructions, combinations, and equivalents falling within the spirit and scope of the disclosure.

What is claimed is:

1. A fitting for a cable, the fitting comprising:
    a connector body having a connection end and an axial bore to allow for passage of the cable therethrough;
    a compression cap configured to attach to the connection end of the connector body, and having an axial bore to allow for passage of the cable therethrough, wherein an end of the compression cap that extends away from the connector body includes a first inner frustoconical portion provided at an end which defines a first inner inclined surface; and
    an adjustable grip assembly removably mounted between the connector body and the compression cap for securing and retaining the cable, the adjustable grip assembly including a resilient grommet removably attached to a flexible tightening member such that the tightening member circumferentially surrounds the grommet;
    wherein the tightening member includes a plurality of cantilevered retaining arms that extend away from the connector body and are configured be pressed against a section of the grommet to compress the grommet upon engagement of distal ends of the retaining arms with the first inner inclined surface of the compression cap, the inclined surface applying both axial and lateral compressive forces to the tightening member and grommet to prevent the cable from begin pulled away from the connector body and assist the grommet in creating and maintaining a watertight seal with the cable when tightening the compression cap to the connector body,
    wherein the connector body includes a second inner frustoconical portion provided at the connection end which defines a second inner inclined surface configured to directly engage a connector-facing end section of the grommet and cause the connector-facing end section of the grommet to be pressed inwardly, thereby further assisting the grommet in creating and maintaining the watertight seal when tightening the compression cap to the connector body; and
    wherein the distal ends of the retaining arms of the tightening member are configured to directly grip the cable to provide additional retention in response to the axial and compressive forces when tightening the compression cap to the connector body.

2. The fitting of claim 1, wherein the connection end of the connector body includes an outer threaded portion, and the compression cap includes an inner threaded portion configured to matingly engage the outer threaded portion.

3. The fitting of claim 1, wherein a top end of the grommet includes an outwardly extending annular lip defining an outer inclined surface corresponding to the inner inclined surface of the connector body such that the outer inclined surface of the annular lip is adapted to abut the inner inclined surface of the connector body.

4. The fitting of claim 3, wherein the grommet is made from an elastomeric material.

5. The fitting of claim 1, wherein the plurality of cantilevered retaining arms are spaced apart by corresponding slits alternately arranged around the circumference of the tightening member.

6. The fitting of claim 1, wherein each retaining arm further comprises a compression portion including an outer inclined surface adapted to abut the first inner inclined surface, and wherein each retaining arm is bendable inward toward the longitudinal axis of the tightening member in a direction toward the grommet.

7. The fitting of claim 5, wherein a top end of each retaining arm is connected to a connection flange, and wherein the connection flange is configured to engage a corresponding recess annularly disposed on the outer surface of the grommet for securing thereto.

8. The fitting of claim 5, further comprising a plurality of retaining flanges configured to grip the cable, wherein each retaining flange is correspondingly connected to a bottom end of each retaining arm.

9. The fitting of claim 8, wherein the plurality of retaining flanges comprise an inner surface having a plurality of gripper elements configured to grip the cable.

10. The fitting of claim 9, wherein the gripper elements are straight teeth-like projections.

11. The fitting of claim 5, wherein each retaining arm has an arcuate inner surface for abutting a corresponding outer arcuate surface of the grommet.

12. The fitting of claim 5, wherein the tightening member is plastic.

13. The fitting of claim 8, wherein each retaining flange is arranged to extend past a bottom end of the grommet for directly engaging the cable.

14. The fitting of claim 5, wherein each retaining arm is perpendicularly cantilevered from the top end of the tightening member.

15. The fitting claim 5, wherein each retaining arm is non-perpendicularly cantilevered from the top end of the tightening member.

16. The fitting of claim 7, wherein the connection flange includes an annularly continuous inwardly extending portion and an annularly continuous outwardly extending portion which define an enlarged flat surface for abutting the grommet.

* * * * *